US010798079B2

(12) United States Patent
Miramonti et al.

(10) Patent No.: US 10,798,079 B2
(45) Date of Patent: Oct. 6, 2020

(54) VEHICLE WITH MOBILE TO VEHICLE AUTOMATED NETWORK PROVISIONING

(71) Applicant: FORD GLOBAL TECHNOLOGIES, LLC, Dearborn, MI (US)

(72) Inventors: Allan Miramonti, Farmington Hills, MI (US); Aziz Makkiya, Troy, MI (US); Rajesh Balaji Vijayan, Dearborn Heights, MI (US); Basavaraj Tonshal, Northville, MI (US); Panduranga Kondoju, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 15/806,130

(22) Filed: Nov. 7, 2017

(65) Prior Publication Data

US 2019/0141023 A1    May 9, 2019

(51) Int. Cl.
| | |
|---|---|
| *G06F 7/04* | (2006.01) |
| *H04L 29/06* | (2006.01) |
| *H04L 12/24* | (2006.01) |
| *H04W 12/04* | (2009.01) |
| *G06F 15/16* | (2006.01) |
| *H04W 4/48* | (2018.01) |
| *H04W 4/80* | (2018.01) |

(Continued)

(52) U.S. Cl.
CPC .......... *H04L 63/08* (2013.01); *H04L 41/0806* (2013.01); *H04L 41/0876* (2013.01); *H04L 63/061* (2013.01); *H04L 63/10* (2013.01); *H04W 12/04* (2013.01); *H04W 4/48* (2018.02); *H04W 4/80* (2018.02); *H04W 12/06* (2013.01); *H04W 12/08* (2013.01); *H04W 84/12* (2013.01)

(58) Field of Classification Search
CPC . H04L 41/0806; H04L 41/0876; H04L 63/08; H04L 63/10; H04L 41/0886; H04L 63/061; H04W 12/04; H04W 12/06; H04W 84/12; H04W 12/08; H04W 4/48; H04W 4/80
USPC ........................ 726/4; 705/304; 455/411, 418
See application file for complete search history.

(56) References Cited

U.S. PATENT DOCUMENTS

| | | |
|---|---|---|
| 9,264,905 B2 | 2/2016 | Ferguson-James et al. |
| 9,277,486 B2 | 3/2016 | Elnajjar |

(Continued)

*Primary Examiner* — Gary S Gracia
(74) *Attorney, Agent, or Firm* — Michael Spenner; Brooks Kushman PC

(57) ABSTRACT

A vehicle that includes one or more controllers coupled to at least one and/or one or more wireless transceivers and antennas. The controllers are configured to enable enhanced, automated provisioning of network hardware of the vehicle with the settings and parameters of required wireless network credentials, by requesting, retrieving, receiving, and utilizing such credentials received from a mobile device. The mobile device includes one or more sets of credentials that are compatible for use with the network hardware configuration or configurations of the controllers, and communications, and network hardware of vehicle. The controller(s) are further configured to store such credentials locally in the vehicle, to request updates, to detect and identify wireless networks identified by such credentials when the wireless networks are in-range of the vehicle network hardware, and to automatically provision and connect the network hardware of vehicle to the detected and identified wireless networks.

20 Claims, 2 Drawing Sheets

(51) Int. Cl.
*H04W 12/06* (2009.01)
*H04W 12/08* (2009.01)
*H04W 84/12* (2009.01)

(56) References Cited

U.S. PATENT DOCUMENTS

| | | | |
|---|---|---|---|
| 9,420,432 B2 | 8/2016 | Matthews, III et al. | |
| 10,140,781 B2* | 11/2018 | Blakemore | G06Q 10/06 |
| 2008/0209045 A1* | 8/2008 | Rothstein | H04L 67/142 |
| | | | 709/227 |
| 2008/0227434 A1* | 9/2008 | Nitta | H04W 60/00 |
| | | | 455/414.1 |
| 2013/0115915 A1* | 5/2013 | Tipton | H04W 24/00 |
| | | | 455/411 |
| 2015/0128219 A1* | 5/2015 | Guday | H04W 12/06 |
| | | | 726/4 |
| 2015/0133108 A1* | 5/2015 | Ahmed | H04W 4/80 |
| | | | 455/420 |
| 2015/0163649 A1* | 6/2015 | Chen | H04W 4/80 |
| | | | 455/418 |
| 2016/0066013 A1* | 3/2016 | Li | H04N 21/41407 |
| | | | 725/75 |
| 2016/0098870 A1* | 4/2016 | Bergerhoff | G07C 9/20 |
| | | | 340/5.61 |
| 2016/0140649 A1* | 5/2016 | Kleve | H04W 12/04 |
| | | | 705/307 |
| 2016/0203661 A1* | 7/2016 | Pudar | G07C 9/00571 |
| | | | 340/5.25 |
| 2016/0241699 A1* | 8/2016 | Milnark | H04W 12/08 |
| 2017/0093536 A1* | 3/2017 | Yoganathan | H04L 5/0032 |
| 2017/0104728 A1 | 4/2017 | Girard et al. | |
| 2017/0150442 A1* | 5/2017 | Cawse | H04W 24/08 |
| 2017/0244716 A1* | 8/2017 | Vissa | H04L 63/083 |

* cited by examiner

VEHICLE WITH MOBILE TO VEHICLE AUTOMATED NETWORK PROVISIONING

TECHNICAL FIELD

The disclosure relates to vehicles equipped with mobile to vehicle communications systems that enable automated provisioning of vehicle communications systems with mobile device network provisioning parameters.

BACKGROUND

Present day vehicles incorporate new technologies that enable such vehicles to communicate with many different devices and systems external to the vehicle. These vehicles include hardware and software based capabilities that enable communications with remote systems and servers that include internet based websites and manufacturer software update and maintenance systems, roadway infrastructure systems and services, and many types of mobile and/or nomadic devices, among others. However, for many reasons, many such vehicles are not utilized for connecting to wireless services such as WiFi and related systems.

One reason may be that most WiFi networks are protected with a number of specialized settings, parameters, and credentials, which are often referred to as a security protocols. These security protocols require users to configure the vehicle WiFi capabilities to enable access according to the various settings, parameters, and credential. The settings, parameters, and credentials that must be known and configured by users to enable the vehicle to utilize ubiquitous WiFi services, can frequently change. This information is unknown to many users who may need the assistance of another to enable configuration, and are often considered to be cumbersome and difficult to comprehend and implement.

Consequently, many vehicle users tend to avoid investing time to configure the vehicle to enable full use of the WiFi communications capabilities of the vehicle. Further, many WiFi capable vehicles are not as capable and as dependent upon as personal mobile devices like laptops, tablets, and smartphones. Additionally, since the primary function of a vehicle is to enable travel, the vehicle is typically out of range of most WiFi networks, such that users have not experienced a compelling reason to configure the vehicle with the needed WiFi settings, parameters, and credentials, especially since such change often. Opportunities exist for improving the ability of users to enable WiFi capabilities of such vehicles.

SUMMARY

Many types of personal, commercial, and industrial vehicles, including combustion engine and hybrid, plug-in hybrid, and battery electric vehicles, hereafter collectively referred to as "vehicles," include several types of vehicle computing systems, controllers, interfaces, networks, communications capabilities, and applications, which enable vehicle operation, as well as on-board and vehicle navigation, vehicle to vehicle and vehicle to infrastructure communications, and related communications capabilities, which include WiFi communications capabilities.

The disclosure is directed to a vehicle that includes at least one and/or one or more controller(s) coupled to a wireless transceiver, which controller(s) is/are configured to respond to an in-vehicle network hardware query received from a mobile device or one or more mobile devices that is/are in communication with the transceiver. In reply, the controller(s) communicate(s) a configuration for the in-vehicle network hardware to the mobile device(s). The mobile device(s) utilize(s) the in-vehicle hardware configuration to identify wireless network credentials that are compatible for use with the in-vehicle network hardware, and transmits all or some of the compatible credentials to the vehicle controller(s). The mobile device(s) may alert a user to consent to transfer all or some of such credentials to the vehicle controller(s), and may enable conditional and/or limited use of the transferred credentials.

If wireless network credentials exist in the mobile device(s) that are compatible for use with the in-vehicle network hardware, and a user of the mobile device(s) consents to transfer of all or some of the credentials, then controller(s) receive, store, and provision the in-vehicle network hardware with the wireless network credentials received from the mobile device. The vehicle controllers also may adjust the credentials as may be needed to ensure compatibility with the in-vehicle network hardware, so as to enable the provisioning.

The controller(s) also generate and communicate a provisioning status to the mobile device in response to the hardware provisioning. The provisioning status includes a message that includes in-vehicle success and/or error provisioning information. In response to an error condition that may arise during attempted provisioning of the in-vehicle network hardware, the controller(s) also are configured to generate the provisioning status to include a credential retransmit request, that enables the mobile device to reinitiate the sequence and resend the credentials to enable another provisioning attempt by the vehicle controller(s).

In variations of the disclosure, the controller(s) are also configured to request and receive from the mobile device and to store one or more and/or a plurality of wireless network credentials for different wireless networks, which are stored on the mobile device, and which are compatible for use with the in-vehicle network hardware, according to the in-vehicle hardware configuration. In this variation, the controller(s) of the vehicle are further configured to respond to detecting a one of the different wireless networks proximate to and in range of the in-vehicle network hardware, to provision the vehicle network hardware with respective wireless network credentials for the detected one of the different wireless networks.

The disclosure also contemplates other modifications of the controller being further configured to receive from the mobile device and to store a plurality of and/or one or more wireless network credentials that also include permissions for different wireless networks. In response to receiving the in-vehicle network hardware configuration, the mobile device may be configured to alert a user to a list of mobile device wireless network credential that are compatible for use by the vehicle network hardware, and to enable the user to grant or deny, and to grant with conditions, limitations, and/or restrictions associated to each of the wireless network credentials, and to generate and transmit to the controller(s) a permission granted signal.

In response to the permission granted signal, the controller(s) are further configured to generate a vehicle network profile that includes one or more of permissions, limitations, and restrictions, which are correlated to each of the plurality of and/or the one or more wireless network credentials. Such permissions include for purposes of example without limitation, expiration times, one time use, time or bandwidth, and/or other types of restricted of limited use of the wireless network credentials.

This modification also may include or includes the controller(s) configured to delete the credentials stored in the vehicle, in response to at least one of an expiration time, a request from the mobile device, one-time use restrictions, and/or other types of limitations and restrictions, which may be and/or are included in the permissions. In further modifications, the controller(s) are also configured to unprovision the vehicle network hardware to remove wireless network credentials that have been deleted according to the permissions, such that the in-vehicle network hardware is disconnected from a connected wireless network.

In other variations, the controller(s) are configured to respond to detecting a wireless network identified by one or more of the wireless network credentials that are stored in the vehicle, and to authenticate and enable an automated connection between the in-vehicle network hardware and the respective wireless network. Such attempted, successful, and/or unsuccessful provisioning and connections to and connection statuses of identified wireless networks are also generated and communicated by the controller(s) to the mobile device(s) and to alert a user, and so that a wireless network connection history log entry may be recorded and/or a user may be alerted.

In response to successful connections and in response to error conditions occurring during an attempt to authenticate and enable an automated connection between the vehicle network hardware and the wireless network, the controller(s) is/are further configured to communicate the error condition to at least one of the controller and the mobile device. In other variations, the controller(s) is/are also configured to respond to such error condition occurrences and to communicate a request to the mobile device for wireless network credentials for the detected wireless network.

In additional configurations of the vehicle, the controller(s) is/are further configured to periodically, upon demand, and/or upon detecting the mobile device connecting or reconnecting to the in-vehicle network hardware, and/or in response to the error condition(s), to communicate a request for updated wireless network credentials from the mobile device. Such update requests may further include a list of previously stored wireless network credentials that include a time stamp, which time stamp enables the mobile device to determine whether newer, changed, and/or updated wireless network credentials exist in the mobile device, which are compatible for use with and which can be communicated to the vehicle controller(s).

Each of the configurations, variations, and modifications also contemplate the controller also coupled to and in communication with at least one and/or one or more of additional transceivers that include any or all or some of near field, Bluetooth, WiFi, and cellular communications transceivers. In these adaptations, the controller(s) is/are further configured to communicate the configuration for in-vehicle near field, Bluetooth, WiFi, and/or cellular network hardware to the mobile device, in response to receiving a vehicle network hardware query from the mobile device.

In response, the mobile device transmits, and the vehicle controller(s) receive and store at least one, a plurality of, and/or one or more wireless credentials for such in-vehicle network hardware. When a wireless network and/or network device is detected, which is identified by the received wireless network credentials, the controller(s) are further configured to provision the vehicle network hardware with at least one of the wireless network credentials of the plurality of WiFi wireless network credentials received from the mobile device.

The controller(s) also adjust the credentials before provisioning, to enable compatibility between the received credentials and the in-vehicle network hardware being provisioned. Such credentials may need to be adjusted even if the in-vehicle network hardware is compatible for use with the received wireless network credentials, but certain settings and parameters of the credentials may need adjustment to ensure compatibility with formatting, text case sensitivity, special character requirements, which may be different between various types of in-vehicle network hardware.

This summary of the implementations and configurations of the vehicles and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
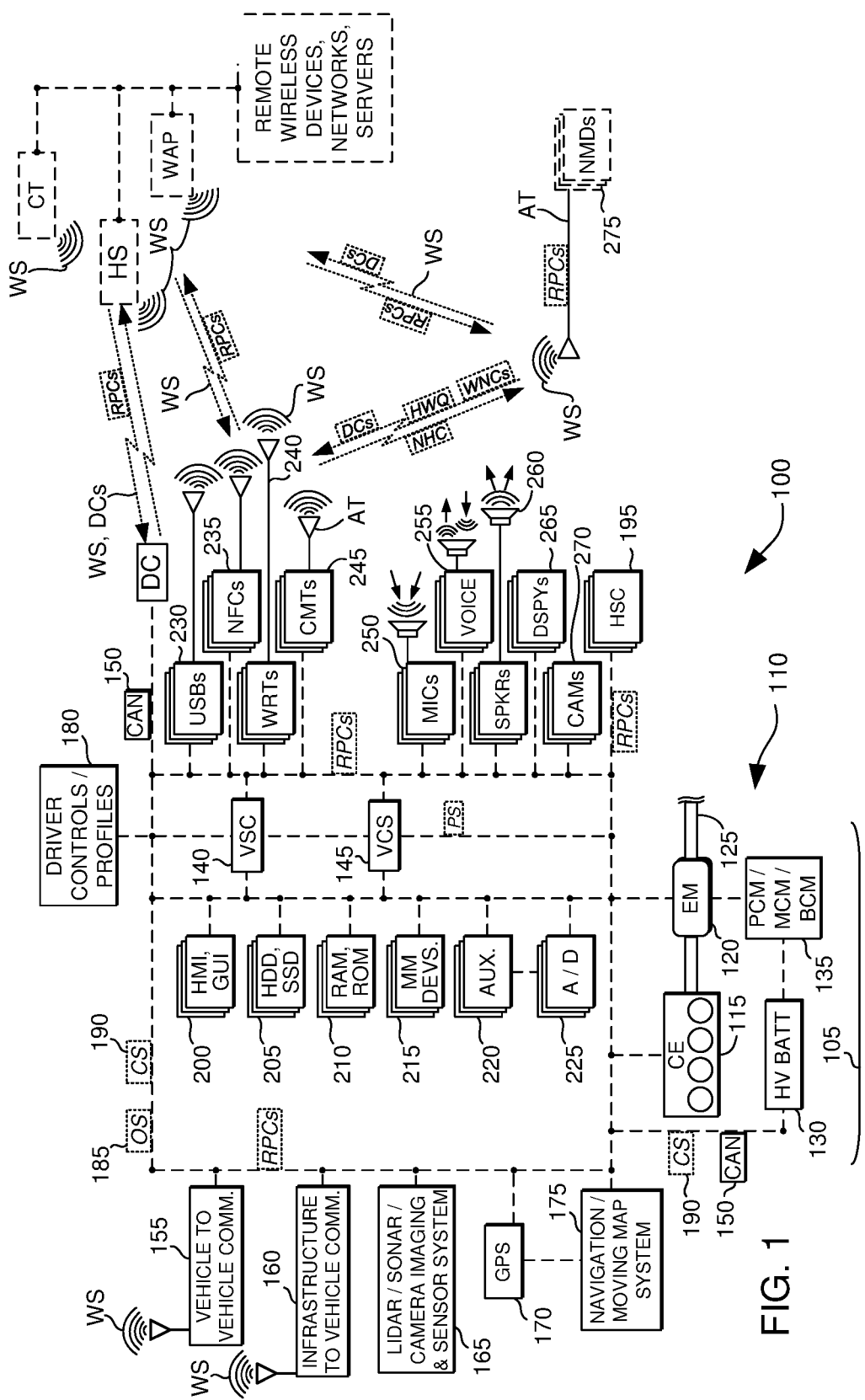
FIG. 1 is an illustration of a vehicle and its systems, controllers, components, sensors, actuators, and methods of operation.
Figure 2:
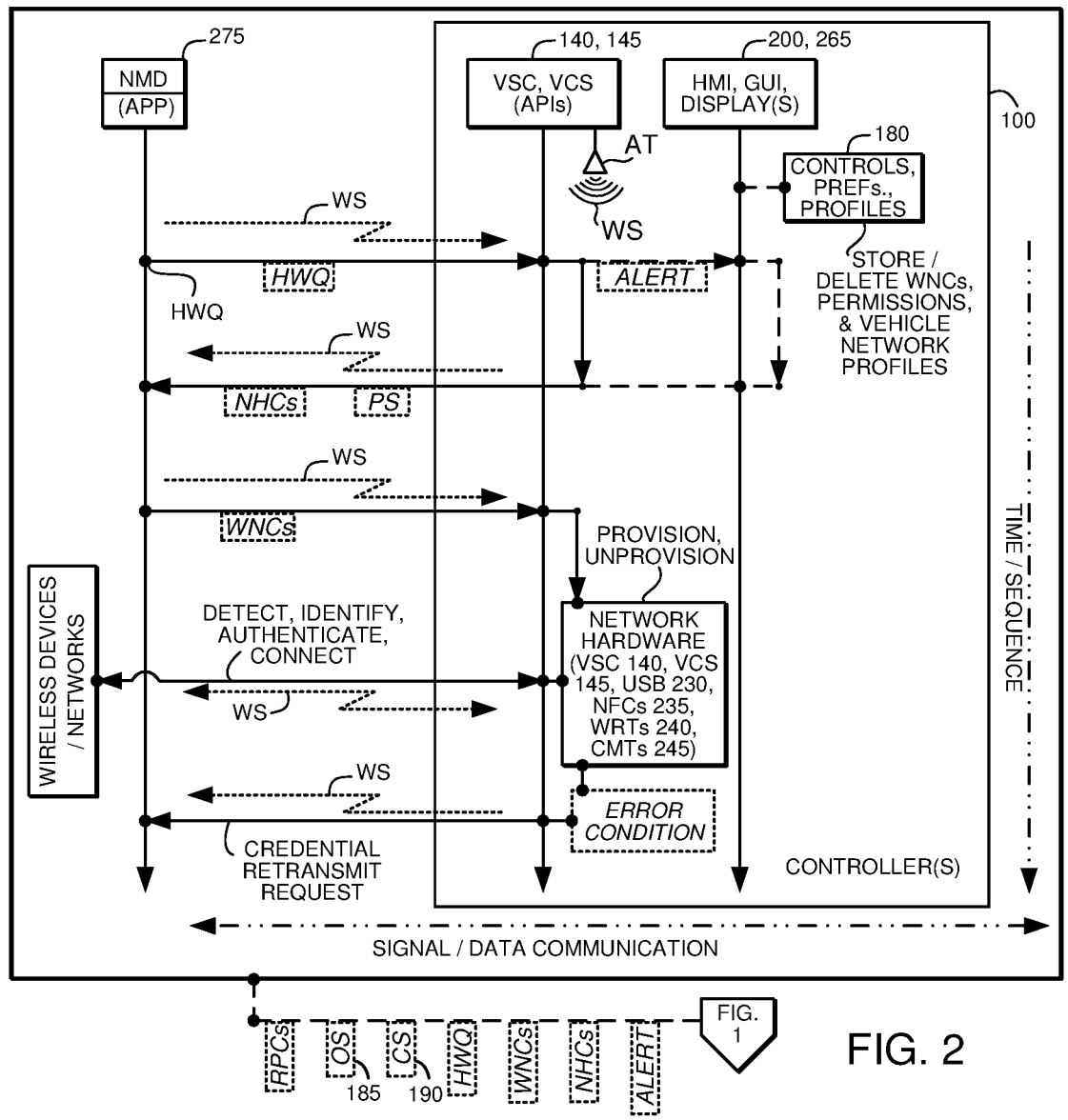
FIG. 2 illustrates certain aspects of the vehicle and methods depicted in FIG. 1, with components removed, added, and rearranged for purposes of further illustration.

With reference now to the various figures and illustrations and to FIGS. 1 and 2, and specifically to FIG. 1, a schematic diagram of a conventional petrochemical-powered and/or hybrid electric vehicle 100 is shown, which vehicles may in further examples also include a battery electric vehicle, a plug-in hybrid electric vehicle, and combinations and modifications thereof, which are herein collectively referred to as a "vehicle" or "vehicles." FIG. 1 illustrates representative relationships among components of vehicle 100. Physical placement and orientation, and functional and logical connections and interrelationships of the components within vehicle 100 may vary. Vehicle 100 includes a driveline 105 that has a powertrain 110, which includes one or more of a combustion engine (CE) 115 and an electric machine or electric motor/generator/starter (EM) 120, which generate power and torque to propel vehicle 100.

Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices. EM 120 may be any one of a plurality of types of electric machines, and for example may be a permanent magnet synchronous motor, electrical power generator, and engine starter 120. CE 115 and EM 120 are configured to propel vehicle 100 via a drive shaft 125 and in cooperation with various related components that may also further include a transmission, clutch(es), differentials, a braking system, wheels, and the like.

Powertrain 110 and/or driveline 105 further include one or more batteries 130. One or more such batteries can be a higher voltage, direct current battery or batteries 130 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 130 operating in the range of between about 6 and 24 volts or more or less, which is/are used to store and supply power for other vehicle components and accessories.

A battery or batteries 130, are respectively coupled to engine 115, EM 120, and vehicle 100, as depicted in FIG. 1, through various mechanical and electrical interfaces and vehicle controllers, as described elsewhere herein. High voltage EM battery 130 is also coupled to EM 120 by one or more of a power train control module (PCM), a motor control module (MCM), a battery control module (BCM), and/or power electronics 135, which are configured to convert and condition direct current (DC) power provided by high voltage (HV) battery 130 for EM 120.

PCM/MCM/BCM/power electronics 135 are also configured to condition, invert, and transform DC battery power into three phase alternating current (AC) as is typically required to power electric machine or EM 120. PCM/MCM/BCM 135/power electronics is also configured to charge one or more batteries 130, with energy generated by EM 120 and/or front end accessory drive components, and to receive, store, and supply power from and to other vehicle components as needed.

With continued reference to FIG. 1, vehicle 100 further includes one or more controllers and computing modules and systems, in addition to PCM/MCM/BCM/power electronics 135, which enable a variety of vehicle capabilities. For example, vehicle 100 may incorporate a body control module (BCM) that is a stand-alone unit and that may be incorporated as part of a vehicle system controller (VSC) 140 and/or a vehicle computing system (VCS) and controller 145, which are in communication with PCM/MCM/BCM 135, and other controllers. For example, in some configurations for purposes of example but not limitation, VSC 140 and/or VCS 145 is and/or incorporates the SYNC™, APPLINK™, MyFord Touch™ and/or open source SmartDeviceLink and/or OpenXC onboard and offboard vehicle computing systems, vehicle connectivity, infotainment, and communications system and application programming interfaces (APIs), for communication and control of and/or with offboard and/or external devices.

For further examples, but not for purposes of limitation, at least one of and/or one or more of the controller(s) such as VSC 140 and VCS 145, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a media player (MP3, Blu-Ray™, DVD, CD, cassette tape, etc.), stereo, FM/AM/satellite radio receiver, and the like, as well as a human machine interface (HMI) and/or display unit as described elsewhere herein.

Such contemplated components and systems are available from various sources, and are for purposes of example manufactured by and/or available from the SmartDeviceLink Consortium, the OpenXC project, the Ford Motor Company, and others (See, for example, SmartDeviceLink.com, openXCplatform.com, www.ford.com, U.S. Pat. Nos. 9,080,668, 9,042,824, 9,092,309, 9,141,583, 9,141,583, 9,680,934, and others).

In further examples, SmartLinkDevice (SDL), OpenXC, and SYNC™ AppLink™ are each examples that enable at least one of and/or one or more of the controller(s) such as VSC 140 and VCS 145, to communicate remote procedure calls (RPCs) utilizing application programming interfaces (APIs) that enable command and control of external or off-board mobile devices and applications, by utilizing vehicle or on-board HMIs, such as graphical user interfaces (GUIs) and other input and output devices, which also include the hardware and software controls, buttons, and/or switches, as well as steering wheel controls and buttons (SWCs), instrument cluster and panel hardware and software buttons and switches, among other controls. Exemplary systems such as SDL, OpenXC, and/or AppLink™ enable functionality of the mobile device to be available and enabled utilizing the HMI of vehicle 100 such as SWCs and GUIs, and also may include utilization of on-board or vehicle automated recognition and processing of voice commands.

Controller(s) of vehicle 100 such as VSC 140 and VCS 145, include and are coupled with one or more high speed, medium speed, and low speed vehicle networks, that include among others, a multiplexed, broadcast controller area network (CAN) 150, and a larger vehicle control system and other vehicle networks that may and/or may not require a host processor, controller, and/or server, and which may further include for additional examples, other micro-processor-based controllers as described elsewhere herein. CAN 150 may also include network controllers and routers, in addition to communications links between controllers, sensors, actuators, routers, vehicle systems and components, and off-board systems and components external to vehicle 100.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

CAN 150 contemplates the vehicle 100 having one, two, three, or more such networks running at varying low, medium, and high speeds that for example nay range from about 50 kilobits per second (Kbps) to about 500 Kbps or higher. CAN 150 may also include, incorporate, and/or be coupled to and in communication with internal, onboard and external wired and wireless personal area networks (PANs), local area networks (LANs), vehicle area networks (VANs), wide area networks (WANs), peer to peer (P2P), vehicle to vehicle (V2V), and vehicle to infrastructure and infrastructure to vehicle (V2I, I2V) networks, among others and as described and contemplated elsewhere herein.

In further examples without limitation, VSC 140, VCS 145, and/or other controllers, devices, and processors, may include, be coupled to, be configured with, and/or cooperate with one or more integrally included, embedded, and/or independently arranged bidirectional communications, navigation, and other systems, controllers, and/or sensors, such as a vehicle to vehicle communications system (V2V) 155, and vehicle to roadway infrastructure to vehicle communication system (V2I) 160, a LIDAR/SONAR (light and/or sound detection and ranging) and/or video camera roadway proximity imaging and obstacle sensor system 165, a GPS or global positioning system 170, and a navigation and moving map display and sensor system 175, among others.

VCS 145 can cooperate in parallel, in series, and distributively with VSC 140 and such steering wheel controls and buttons and other controllers, subsystems, and internal and external systems to manage and control vehicle 100, external devices, and such other controllers, and/or actuators, in response to sensor and communication signals, data, parameters, and other information identified, established by, communicated to, and received from these vehicle systems, controllers, and components, as well as other off-board systems that are external and/or remote to vehicle 100.

Such bidirectional V2V 155 and V2I 160 (sometimes also referred to herein collectively as V2X) communications controllers and systems enable peer to peer, vehicle to vehicle, and vehicle to infrastructure ad hoc and similar types of networks and communications, utilizing various industry protocols, standards, and/or messaging formats that available in the United States and other countries. Such protocols, standards, and/or messaging formats are utilized for purposes of enabling various aspects of the disclosure and are known to those having knowledge in the relevant technology.

For example, IEEE Standards 802.11 support software and firmware communications services of IEEE 1609, and are enable data link media access control (MAC) and physical layer (PHY) capabilities, such as wireless local area network (WLAN) data communications in various frequency bands. The 802.11 standard is entitled "IEEE Standard for Information technology—Telecommunications and information exchange between systems—Local and metropolitan area networks—Specific requirements Part 11: Wireless LAN Medium Access Control (MAC) and Physical Layer (PHY) Specifications," and is available at ieeexplore.ieee.org/document/7792308.

The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers, components, subsystems, and systems, both in the singular and plural connotations, and individually, collectively, and in various suitable cooperative and distributed combinations.

Further, communications over CAN 150 and other internal and external PANs, LANs, and/or WANs, are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, PCM/MCM/BCM 135, VSC 140, VCS 145, CAN 150, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off.

Computer-readable storage devices or media may be implemented using any of a number of known persistent and non-persistent memory devices such as PROMs (programmable read-only memory), EPROMs (electrically PROM), EEPROMs (electrically erasable PROM), hard disk drives (HDDs), solid state drives (SSDs), flash memory, or any other electric, magnetic, optical, or combination memory devices capable of storing and communicating data. Each of such devices, components, processors, microprocessors, controllers, microcontrollers, memories, storage devices, and/or media may also further contain, include, and/or be embedded with one or more basic input and output systems (BIOSs), operating systems, application programming interfaces (APIs) having, enabling, and/or implementing remote procedure call (RPCs), and related firmware, microcode, software, logic instructions, commands, and the like, which enable programming, customization, coding, and configuration, and which may be embedded and/or contained in at least one of and/or distributed across one or more such devices, among other capabilities.

The embodiments of vehicle 100 in FIG. 1 also depict exemplary sensors and actuators in communication with wired and/or wireless vehicle networks and CAN 150 (PANs, LANs) that can bidirectionally transmit and receive data, commands, and/or signals to and from VSC 140, VCS 145, and other controllers. Such control commands, logic, and instructions and code, data, information, signals, settings, and parameters, including driver preferred settings and preferences, may be captured and stored in, and communicated from a repository of driver controls, preferences, and profiles of repository 180, as well as memory and data storage of the other controller(s).

As described and illustrated in the various figures, including FIGS. 1 and 2, the signals and data, including for example, commands, information, settings, parameters, control logic and executable instructions, and other signals and data, can also include other signals (OS) 185, and control or command signals (CS) 190 received from and sent to and between controllers and vehicle components and systems, either over wired and/or wireless data and signaling connections. OS 185, and CS 190, and other signals, related control logic and executable instructions, parameters, and data can and/or may be predicted, generated, established, received, communicated, to, from, and between any of the vehicle controllers, sensors, actuators, components, and internal, external, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIG. 1 and other figures, and by schematically represented data communication lines and signals and wireless signals and data connections. Such diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

FIG. 1 also schematically depicts for continuing illustration purposes but not for purposes of limitation, an example configuration and block topology for VCS 145 for vehicle 100 and its contemplated controllers, devices, components, subsystems, and/or systems. The disclosure is directed to the HMIs including the hardware and software switches and controls (HSCs) 195, which further refer to, incorporate, and include buttons, and/or switches, and steering wheel controls and buttons (SWCs), instrument cluster and panel hardware and software buttons and switches, and GUI display software switches and controls, among other controls.

In additional exemplary arrangements, the various controllers, such as for example VCS 145, include(s) and/or may include in some arrangements, at least one and/or one or more human machine interfaces (HMIs)/graphical user interface(s) and visual display(s) (GUIs, HMIs) 200 that may be located in a cabin of vehicle 100. HMIs/GUIs 200 may also be coupled and cooperate with automated speech recognition and speech synthesis subsystems, as well as with additional hardware and software controls, buttons, and/or switches, which are incorporated, included, and/or displayed on, about, and/or as part of HMI/GUI 200 and instrument clusters and panels of vehicle 100.

Such controls, buttons, and/or switches may be integrated with HMIs/GUIs 200, as well as with other vehicle devices and systems that may include, for further examples and illustrations, a steering wheel and related components, vehicle dashboard panels and instrument clusters, and the like. For added purposes of example without limitation, VCS 145 may include and/or incorporate persistent memory and/or storage HDDs, SSDs, ROMs 205, and non-persistent or persistent RAM/NVRAM/EPROM 210, and/or similarly configured persistent and non-persistent memory and storage components.

VCS 145 and/or other controller(s), in illustrative but non-limiting examples, also include, incorporate, and/or are coupled to one or more vehicle-based bidirectional data input, output, and/or communications and related devices and components, which enable communication with users, drivers, and occupants of vehicle 100, as well as with external proximate and remote devices, networks (CAN 150, PANs, LANs, WANs), and/or systems. The phrases "vehicle-based" and "onboard" refer to devices, subsystems, systems, and components integrated into, incorporated about, coupled to, and/or carried within vehicle 100 and its various controllers, subsystems, systems, devices, and/or components. In contrast, the phrase "offboard" is directed to and contemplates such controllers, subsystems, systems, devices, and/or components being located external to and/or remote from vehicle 100.

For additional examples, VCS 145, GUIs 200, and other controllers of vehicle 100, may include, incorporate, be paired to, synchronized with, and/or be coupled with vehicle-based multimedia devices 215, auxiliary input(s) 220 and analog/digital (A/D) circuits 225, universal serial bus port(s) (USBs) 230, near field communication transceivers (NFCs) 235, wireless routers and/or transceivers (WRTs) 240, such as "Bluetooth™" devices, that enable wireless personal and local area networks (WPANs, WLANs) or "WiFi" IEEE 802.11 and 803.11 communications standards, and/or analog and digital cellular network modems and transceivers (CMTs) 245 utilizing voice/audio and data encoding and technologies that include for example, those managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

Such contemplated onboard and offboard devices and components, among others, are configured to enable bidirectional wired and wireless communications between components and systems of vehicle 100, CAN 150, and other external devices and systems and PANs, LANs, and WANs. A/D circuit(s) 225 is/are configured to enable analog-to-digital and digital-to-analog signal conversions. Auxiliary inputs 220 and USBs 230, among other devices and components, may also enable in some configurations wired and wireless Ethernet, onboard diagnostic (OBD, OBD II), free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 220 and A/D circuits 225, USBs 230, NFCs 235, WRTs 240, and/or CMTs 245, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 150, VCS 145, and other controllers and networks of vehicle 100. Auxiliary inputs 220, A/D circuits 225, USBs 230, NFCs 235, WRTs 240, and/or CMTs 245, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices are contemplated to be integrated with, coupled to, and/or connectable to, auxiliary inputs 220, A/D circuits 225, USBs 230, NFCs 235, WRTs 240, and/or CMTs 245, as well as to the other contemplated controller(s) and wired and wireless networks internal to vehicle 100, and in some circumstances external to vehicle 100. For example, the one or more input and output devices include microphones 250, voice processing and recognition devices and subsystems 255, speaker(s) 260, additional display(s) 265, camera(s) 270, nomadic and mobile devices (NMDs) 275, among others, which each include at least one and/or one or more integrated signaling and communications antennas and/or transceivers (AT).

Such input and output devices are and/or may be selectable, connectable, synchronized with, paired to, and/or actuatable with an input selector that may be any of HSCs 195, and may also include, incorporate, and/or be integrated with and/or as part of GUI 200 and the contemplated hardware and software SWCs, controls, buttons, and/or switches 195. Such HSCs 195, as already noted, may be hardware or software or combinations thereof and may be configurable utilizing one or more predetermined, default, and adjustable factory and/or driver controls, profiles, and/or preferences 180.

The contemplated microphones 250, voice processing and recognition devices and subsystems 255, speaker(s) 260, additional display(s) 265, camera(s) 270, NMDs 275, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC speakers and stereo devices and players, portable GPS devices, and similar devices and components that each may include integrated transceivers and antennas AT, wired and plugged connectors DC, and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections (DCs) and wired and wireless signals and signaling and data communications and streams WS, with external near and far nomadic, portable, and/or mobile devices 275, networks, and systems, and hotspots and wireless access points (HS/WAPs), nano and micro and regular cellular access points and towers (CT), external routers (XRs), and related and accessible external, remote networks, systems, and servers.

With continuing reference to the disclosure and various figures, including FIGS. 1 and 2, it may be understood by those with knowledge in the relevant fields of technology that the disclosure contemplates vehicle 100 to include at least one and/or one or more controller(s) such as VSC 140, VCS 145, and others coupled with a vehicle or on-board transceiver AT, such as those described in connection with USBs 230, NFCs 235, WRTs 240, and/or CMTs 245. The controller(s) 140, 145 and transceiver(s) AT are configured to detect WSs and connect to nearby or proximate or far, wired and wireless network devices having in-range WSs, as well as third-party, off-board, external devices such as nomadic, portable, and/or mobile or nomadic mobile devices 275.

Vehicle 100 also includes at least one and/or one or more of the described controller(s), such as VSC 140, VCS 145, and others, being coupled to at least one and/or one or more wireless transceivers and antennas AT. The controller(s) 140, 145 and others is/are configured to enable enhanced, automated provisioning of network hardware of vehicle 100 with the settings and parameters of required wireless network credentials (WNCs), by requesting, retrieving, receiving, and utilizing WNCs from a mobile device, such as one or more of the NMDs 275, which has one or more WNCs available that are compatible for use with the network hardware configuration or configurations (NHCs) of the various controller(s), and communications, and network hardware of vehicle 100. The controller(s) are further configured to store such WNCs locally in vehicle 100, and to detect and identify wireless networks identified by such WNCs when their respective WSs are in-range of the network hardware of vehicle 100, and to automatically provision and connect the vehicle network hardware to the detected and identified wireless networks.

Such network hardware of vehicle 100 includes, for purposes of example but not limitation, at least one and/or one or more of VSC 140, VCS 145, USB 230, NFCs 235, WRTs 240, and/or CMTs 245, which each include and/or are coupled with transceivers and antennas AT, and which include such vehicle network hardware configured for communications with Bluetooth™, WiFi, and related networking technology and protocols as described elsewhere herein. While many further examples described herein refer primarily to WiFi as an exemplary technology and capability, the disclosure contemplates similar automated provisioning capabilities for the various related technologies other than WiFi as already described.

The vehicle controller(s) are further configured to detect one or more mobile devices or NMDs 275 that are in communication with vehicle 100 via the transceivers AT, and to respond to communications and requests from such devices 275. The controller(s) are also configured to respond to an in-vehicle network hardware query (HWQ) from the mobile device(s) 275. Typically, the controller(s) and onboard vehicle-side applications will first communicate the in-vehicle NHC in response the query from the mobile device(s) 275, to enable the devices 275 to determine whether they have any WNCs that are compatible for use with the NHC of vehicle 100.

Additionally, sharing the in-vehicle NHC enables users of the mobile devices 275 to consent and enable sharing of such WNCs with vehicle 100. This is an especially valuable capability that enables a user of a rental vehicle or a vehicle owned by another to prevent, limit, and/or restrict sharing of the WNCs with vehicles that may not need permanent access to such WNCs stored in the mobile devices or NMDs 275.

NMDs and mobile devices 275 may be configured to use the in-vehicle NHC to identify stored WNCs that are and that may be compatible for use with the network hardware of vehicle 100. Further, NMDs and mobiles devices that are so enabled, then transmit to vehicle 100 controller(s) and transceivers AT, all or some of the compatible WNCs. In variations, NMDs and mobile devices 275 are also configured to alert a user that such compatible WNCs exist, and that such can be communicated to vehicle 100. The NMD-side applications (APP, FIG. 2) are configured to enable the user to consent to transfer one, some, and/or all of such WNCs to the controller(s) and transceivers AT of vehicle 100. Additionally, the disclosure contemplates such mobile-device-side applications being further configured to enable the user to assign permissions to one, some, and/or all such WNCs before being transmitted, such that the controller(s) of vehicle 100 will only be enabled for conditional, restricted, limited, and/or unlimited use of the transferred WNCs.

The vehicle-side applications and controller(s) such as VSC 140, VCS 145, USB 230, NFCs 235, WRTs 240, and/or CMTs 245, are further configured to, if compatible WNCs exist in NMDs 275, a user of the NMDs 275 consents to transfer of all or some of the WNCs with conditional, restricted, limited, and/or no limitations on use of the transferred WNCs, then such controller(s) and devices of vehicle 100 receive, store, and provision the onboard or in-vehicle network hardware with the WNCs received from the mobile device(s) 275, to enable automatic connection to external networks. Such WNCs may typically include settings and parameters such as, for purposes of example without limitation, SSIDs (IEEE 802.11 service identifiers), BSSIDs (IEEE 802.11 basic SSIDs), MAC identifiers (IEEE 802.11 media access control), wireless device security protocols, security key management identifiers for such protocols, enabled cipher identifiers, passwords, security keys, static network and device addresses, and/or dynamic network and device address host names, among other data.

Such other data may include permissions, limitations, conditions, and/or restrictions that are associated and/or correlated to each of such WNCs, as well as to each of such settings and parameters. For example, a permission may enable sharing with vehicle 100 a specific WNC, but may restrict or prevent sharing of the password or the key, to enable such to be entered manually by a user of the vehicle-side controller(s) and device(s) and applications. In another example, an otherwise hidden SSID or BSSID, or another setting or parameter may be redacted from the shared WNC.

While most of such settings and parameters for the WNCs are typically compatible for use with nearly all 802.11 compliant network hardware of vehicle 100 and external wireless network devices, there are sometimes adjustments that may be to made to enable compatibility of such WNCs for use by the specific vehicle-side hardware and applications. Accordingly, the controller(s) and devices of vehicle 100 are further configured to enable adjustment of the WNCs when needed.

For purposes of illustration but not for purposes of limitation, one or more settings and parameters of WNCs may need to be adjusted or modified to change case of text data, insert time delays during authentication of WNCs to external wireless devices, redact or supplement certain parameters, convert a network address format, and/or to remove, add special characters, bit or byte values, prefixes, and/or suffixes, to the WNCs. Such adjustments and modification enables WNCs received from NMDs 275 to be compatible for use by the vehicle-side controller(s) and applications in provisioning the network hardware, controller(s), applications, and devices of vehicle 100. The controller(s) of vehicle 100 are further configured to store the received WNCs onboard the vehicle 100, and may retain the WNCs as part of and/or with the driver controls and profiles 180, or another storage location.

The controller(s) and devices of vehicle 100 are configured to additionally generate and communicate a provisioning and connection status (PS) to the NMDs and mobile device(s) 275, in response to the vehicle network hardware provisioning and/or connection to a wireless network being attempted and/or completed. The PS includes a message that describes in-vehicle success and/or error condition provisioning information. For example, during attempted provisioning of the in-vehicle network hardware, and responsive to an error condition that may arise, vehicle controller(s) are configured to generate PS to include a credential retransmit request. The retransmit request enables the mobile device to reinitiate the sequence of sharing WNCs with vehicle 100, and to resend the WNCs to enable another provisioning attempt by the vehicle controller(s). This capability enables error recovery when WNCs were received and/or stored by vehicle controller(s) with corrupt data, and when such WNCs may have been improperly adjusted by the controller(s) and/or by a vehicle user.

The vehicle-side controllers are further modified to request, receive, and store from NMDs and mobile devices 275, a plurality of and/or one or more of the WNCs, each for different wireless networks that are stored on NMDs and mobile device(s) 275. As before, the disclosure contemplates NMDs 275 being configured to utilize the NHC of vehicle 100 to determine which mobile-side WNCs are compatible for use with in-vehicle network hardware. The vehicle controller(s) and devices are also configured to automatically detect, identify, authenticate to, and connect to one of the different wireless networks, when such networks are near or proximate to and in range of the network hardware of vehicle 100. Upon detecting and identifying such different wireless networks, the vehicle-side controller(s) and application automatically provision the vehicle network hardware with respective WNCs for the detected and identified one of the different wireless networks.

In additional configurations of the disclosure, the vehicle controller(s) are also modified to receive store the WNCs, for the different wireless networks, which include permissions that enable conditional, restricted, limited, and/or unlimited use by the vehicle-side controller(s) and devices. Users of NMDs and mobile device(s) 275 can deny, grant, and grant with permissions, the vehicle controller(s) to automatically use the WNCs, by assigning and correlating such permissions to each of the WNCs that are shared with the vehicle controller(s) and device(s). The vehicle controller(s) may receive a permission grant signal (PGS) as part of and/or separately from the shared WNCs. A combined and/or separate transmission of PGS may enable additional security enhancements for certain applications that require permission controls to be communicated separate from WNCs. The vehicle controller(s) and device(s) are also enabled to respond to the PGS and WNCs, to generate a modified WNC or vehicle network profile, which for example includes one or more of permissions, limitations, conditions, and/or restrictions that are correlated to each of the WNCs.

Generating such a vehicle network profile, which also may be stored as or with the driver controls and profiles 180, from the WNCs, enables vehicle-side editing, updating, and modification that may be desired by a vehicle owner who may wish to modify and enhance certain settings and parameter of the stored WNCs, without adulterating the originally received WNCs. Such vehicle network profiles also may be configured to enable modified WNC permissions that include, for example without limitation, vehicle user preferred expiration times, one time use automated expiration times, time or bandwidth, and/or other types of restricted of limited use of the WNCs and vehicle network profiles, so as to enable a vehicle user to control automated provisioning, authentication, and/or connection to detected and identified wireless networks utilizing the WNCs and profile.

Controller(s) and device(s) of vehicle 100 also are configured to enable deletion of WNCs either manually, upon request from NMDs and mobile device(s) 275, and in response to at least one of the permissions, such as an expiration time, one-time use restrictions, and/or other types of limitations, conditions, and/or restrictions. Additional variations of the disclosure include the controller(s) and devices of vehicle 100 to delete from local vehicle storage and to unprovision vehicle network hardware, WNCs that expire and/or that are to be deleted according to the permissions. The vehicle controller(s) and device(s) also respond to such permissions and requests by disconnecting the in-vehicle network hardware from a connected wireless network associated with the deleted or expired WNC(s).

The disclosure contemplates other variations that are directed to the controller(s) and devices of vehicle 100 also configured to respond to detecting a wireless network that is identified by the vehicle-stored WNCs, and to provision vehicle network hardware, authenticate to the wireless network, and enable automated connection between the in-vehicle network hardware and the detected and identified wireless network. In further arrangements, PS may be generated and communicated by the controller(s) and device(s) of vehicle 100 to annunciate an alert to a vehicle user, and communicated to NMDs and mobile device(s) 275. Additionally, in response to automated connection to wireless networks and error conditions generated during attempts, the generated provisioning and connection status PS may also be recorded and stored by the vehicle controller(s) and device(s) in a wireless network connection history log, and may be communicated to alert a vehicle user and to be transmitted to NMDs and mobile devices 275, as may be needed in certain applications.

Responsive to successful automated provisioning, authentication, and connection, and to error conditions that occur during such automated attempts, of and between the vehicle network hardware and the wireless network, the controller(s) and device(s) of vehicle 100 is/are configured to communicate the success status and error condition to at least one of the controller(s) and device(s), and to NMDs and mobile device(s) 275. Additionally, the vehicle controller(s) and device(s) is/are configured to respond to such successful attempts and error condition occurrences, and to communicate a new request to NMDs and mobile device(s) 275 for new, updated, changed, and/or modified WNCs for the detected wireless network.

Similarly, the controller(s) and device(s) of vehicle 100 is/are also modified to communicate a request for updated WNCs from NMDs and mobile device(s) 275, periodically, upon demand, and/or in response to detecting such NMDs and mobile device(s) 275 connecting, being connected, and/or reconnecting to the in-vehicle network hardware, and/or in response to the error condition(s). These contemplated WNC update requests further include or may include a list of previously stored WNCs that include a time stamp. The time stamp enables NMDs and mobile device(s) 275 to evaluate the request for updates and to determine whether newer, changed, and/or updated WNCs exist and/or are stored in NMDs and mobile device(s) 275. Compatibility also is evaluated by NMDs and mobile device(s) utilizing the vehicle NHC, to identify compatible WNCs that can be communicated with the vehicle controller(s) and device(s).

As described in more detail elsewhere herein, each of these configurations, variations, and modifications of vehicle 100 and its controller(s) and device(s), also enable the vehicle controller(s) to be coupled to and in communication with at least one and/or one or more of the transceivers and antennas AT including any or all or some of near field communications, Bluetooth™ communications, WiFi wireless communications, and cellular communications transceivers. In these additionally preferred and optional variations, the vehicle controller(s) and device(s) is/are further configured to communicate the respective vehicle-side NHCs for such in-vehicle near field, Bluetooth™, WiFi, and/or cellular network hardware to the NMDs and mobile device(s) 275, in response to receiving the HWQ. As with earlier configurations, NMDs and mobile device(s) transmit, and vehicle controller(s) receive and store at least one, a plurality of, and/or one or more WNCs for such additionally described in-vehicle network hardware. Similar to the previously described arrangements, when a wireless network and/or wireless network device is detected that is identified by the received WNCs, the vehicle controller(s) provision the vehicle network hardware with at least one of the WNCs of the plurality of NFC, Bluetooth, and/or WiFi WNCs received from NMDs and the mobile device(s) 275.

With continuing reference to FIG. 1 and now also to FIG. 2, the exemplary arrangements and methods of the disclosure are depicted and include controlling vehicle 100 by the controller(s) and devices VSC 140, VCS 145, USB 230, NFCs 235, WRTs 240, and/or CMTs 245, coupled to, integrated with, incorporating, and/or in communication with one or more wireless transceivers and antennas AT. The vehicle controller(s) and devices(s), responsive to receiving an HWQ from NMDs and mobile device(s) 275 in communication with controller(s) 140, 145, and/or others and transceivers and antennas AT, are enabled for communicating NHC to the NMDs and mobile device(s) 275.

The methods also contemplate provisioning the vehicle network hardware with WNCs received from the device and adjusted to enable the provisioning. The methods further include the controller(s) and device(s) of vehicle 100 configured for communicating the provisioning status PS to the mobile device in response to the attempted and/or successful provisioning of vehicle network hardware.

The disclosure contemplates such methods also, by the controller(s) and device(s) of vehicle 100, generating PS to include the credential retransmit request in response to an error condition arising during the provisioning. In other variations, the methods also include receiving from NMDs and mobile device(s) 275, and storing in profiles 180, one or more and/or a plurality of WNCs for the different wireless networks, and in response to detecting one or more of the different wireless networks. Such received and stored WNCs may also include the permissions, deleting WNCs, and unprovisioning the vehicle network hardware to remove WNCs deleted according to the permissions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a controller coupled to a wireless transceiver, and configured to:
in response to receiving a network hardware query from a mobile device in communication with the transceiver via a first wireless link,
communicate a configuration for in-vehicle network hardware to the mobile device via the first wireless link,
receive a wireless network credential from the mobile device via the first wireless link based on a user of the mobile device consenting to transfer the wireless network credential,
detect a wireless network identified by the wireless network credential that is stored in the vehicle,
adjust the wireless network credential to enable compatibility between the received wireless network credential and the in-vehicle network hardware by at least one of: inserting a time delay, redacting predefined parameters, supplementing predefined parameters, or converting a network address format,
authenticate and enable an automated connection between the in-vehicle network hardware and respective wireless network and provision the in-vehicle network hardware with wireless network credential as adjusted to prepare to connect to the mobile device via the respective wireless network, and
communicate a provisioning and connection status including a message that describes in-vehicle success and/or error to the mobile device in response to the hardware provisioning via the first wireless link.

2. The vehicle according to claim 1, wherein
the controller further is configured to generate the provisioning status to include a credential retransmit request in response to an error condition arising during the provisioning.

3. The vehicle according to claim 1, wherein
the controller is further configured to:
receive from the mobile device and store a plurality of wireless network credentials for different wireless networks, and
in response to detecting a one of the different wireless networks,
provision the in-vehicle network hardware with a respective wireless network credential for the detected one of the different wireless networks.

4. The vehicle according to claim 1, wherein
the controller is further configured to:
receive from the mobile device and store a plurality of wireless network credentials and permissions for different wireless networks, and
delete the stored credentials in response to at least one of an expiration time and one-time use restrictions included in the permissions, and
unprovision the in-vehicle network hardware to remove wireless network credentials deleted according to the permissions.

5. The vehicle according to claim 1, wherein
the controller is further configured to:
in response to detecting a wireless network identified by the wireless network credential,
authenticate and enable an automated connection between the in-vehicle network hardware and the wireless network, and
communicate to a connection status for the wireless network to the controller.

6. The vehicle according to claim 1, wherein
the controller is further configured to:
in response to detecting a wireless network identified by the wireless network credential, and
in response to an error condition occurring during an attempt to authenticate and enable an automated connection between the in-vehicle network hardware and the wireless network,
communicate the error to at least one of the controller and the mobile device.

7. The vehicle according to claim 1, wherein
the controller is further configured to:
in response to detecting a wireless network identified by the wireless network credential, and
in response to an error condition occurring during an attempt to authenticate and enable an automated connection between the in-vehicle network hardware and the wireless network,
communicate a request to the mobile device for wireless network credential for the detected wireless network.

8. The vehicle according to claim 1, wherein
the controller is further configured to:
in response to detecting the mobile device in communication with the transceiver,
communicate a request for updated wireless network credentials from the mobile device, which request includes a list of stored wireless network credentials that include a time stamp.

9. The vehicle according to claim 1, comprising:
the mobile device including a controller configured to
detect a communication link with the wireless transceiver, and
in response to a permission granted signal,
to generate a vehicle network profile that includes permissions that are correlated to each of a plurality of wireless network credentials.

10. The vehicle according to claim 1, wherein
the controller is further coupled to and in communication with at least one of additional transceivers that include one or more of near field, Bluetooth, WiFi, and cellular communications transceivers, the controller further configured to:
communicate the configuration for vehicle WiFi network hardware to the mobile device, in response to receiving a vehicle WiFi network hardware query from the device,
provision the vehicle WiFi network hardware with at least one WiFi wireless network credential of a plurality of WiFi wireless network credentials received from the mobile device, which are adjusted to enable the WiFi network hardware provisioning, and
communicate a WiFi network hardware provisioning status to the mobile device in response to the provisioning.

11. A vehicle, comprising:
a transceiver configured to connect to a mobile device via a data link; and
a controller coupled to the transceiver, and configured to:
in response to receiving a WiFi hardware query from the mobile device in communication with the transceiver, communicate a configuration for vehicle WiFi hardware to the mobile device via the data link,
receive a WiFi network credential from the mobile device via the data link based on a user of the mobile device consenting to transfer the WiFi network credential,
detect a WiFi network identified by the WiFi network credential that is stored in the vehicle,
adjust the WiFi network credential to enable compatibility between the received WiFi network credential and the WiFi hardware by at least one of: inserting a time delay, redacting predefined parameters, supplementing predefined parameters, or converting a network address format,
authenticate and enable an automated connection between WiFi hardware and respective WiFi network and provision the WiFi hardware with WiFi network credential as adjusted to prepare to connect to the mobile device via the respective WiFi network, and
communicate a provisioning and connection status including a message that describes in-vehicle success or error to the mobile device in response to the WiFi provisioning via the data link.

12. The vehicle according to claim 11, wherein
the controller is further configured to:
receive from the mobile device and store a plurality of WiFi network credentials for different WiFi networks, and
in response to detecting a one of the different WiFi networks,
provision the vehicle WiFi hardware with a respective WiFi network credential for the detected one of the different WiFi networks.

13. The vehicle according to claim 11, wherein
the controller is further configured to:
receive from the mobile device and store a plurality of WiFi network credentials and permissions for different WiFi networks, and
delete the stored credentials in response to at least one of an expiration time and one-time use restrictions included in the permissions, and
unprovision the vehicle WiFi hardware to remove WiFi network credentials deleted according to the permissions.

14. The vehicle according to claim 11, wherein
the controller is further configured to:
in response to detecting a WiFi network identified by the WiFi network credential,
authenticating and enabling an automated connection between the vehicle WiFi hardware and the WiFi network, and
communicating to the controller one or more of a provisioning and connection status for the WiFi network.

15. The vehicle according to claim 11, wherein
the controller is further configured to:
in response to detecting a WiFi network identified by the WiFi network credential, and
in response to an error condition occurring during an attempt to authenticate and enable an automated connection between the vehicle WiFi hardware and the WiFi network,
communicating a request to the mobile device for WiFi network credential for the detected WiFi network.

16. A method of controlling a vehicle, comprising:
by a controller, coupled to a wireless transceiver,
in response to receiving a network hardware query from a mobile device in communication with the transceiver via a first wireless connection,
communicating a configuration for in-vehicle network hardware to the mobile device via the first wireless connection based on a user of the mobile device consenting to transfer the wireless network credential,
receive a wireless network credential from the mobile device via the first wireless connection,
detect a wireless network identified by the wireless network credential that is stored in the vehicle,
adjust the wireless network credential to enable compatibility between the received wireless network credential and the in-vehicle network hardware by at least one of: inserting a time delay, redacting predefined parameters, supplementing predefined parameters, or converting a network address format,
authenticate and enable an automated connection between the in-vehicle network hardware and respective wireless network and provisioning the in-vehicle network hardware with wireless network credential as adjusted to prepare to connect to the mobile device via the respective wireless network, and communicating a provisioning and connection status including a message that describes in-vehicle success or error to the mobile device in response to the hardware provisioning via the first wireless connection.

17. The method according to claim 16, further comprising:
by the controller,
generating the provisioning status to include a credential retransmit request in response to an error condition arising during the provisioning.

18. The method according to claim 16, further comprising:
by the controller,
receiving from the mobile device and storing a plurality of wireless network credentials for different wireless networks, and
in response to detecting a one of the different wireless networks,
provisioning the in-vehicle network hardware with a respective wireless network credential for the detected one of the different wireless networks.

19. The method according to claim 16, further comprising:
by the controller,
receiving from the mobile device and storing a plurality of wireless network credentials and permissions for different wireless networks, and
deleting the stored credentials in response to at least one of an expiration time and one-time use restrictions included in the permissions, and
unprovisioning the in-vehicle network hardware to remove wireless network credentials deleted according to the permissions.

20. The method according to claim 16, further comprising:
by the controller,
in response to detecting a wireless network identified by the wireless network credential,
authenticating and enabling an automated connection between the in-vehicle network hardware and the wireless network, and
communicating to the controller one or more of a provisioning and connection status for the wireless network.

\* \* \* \* \*